Patented Nov. 15, 1949

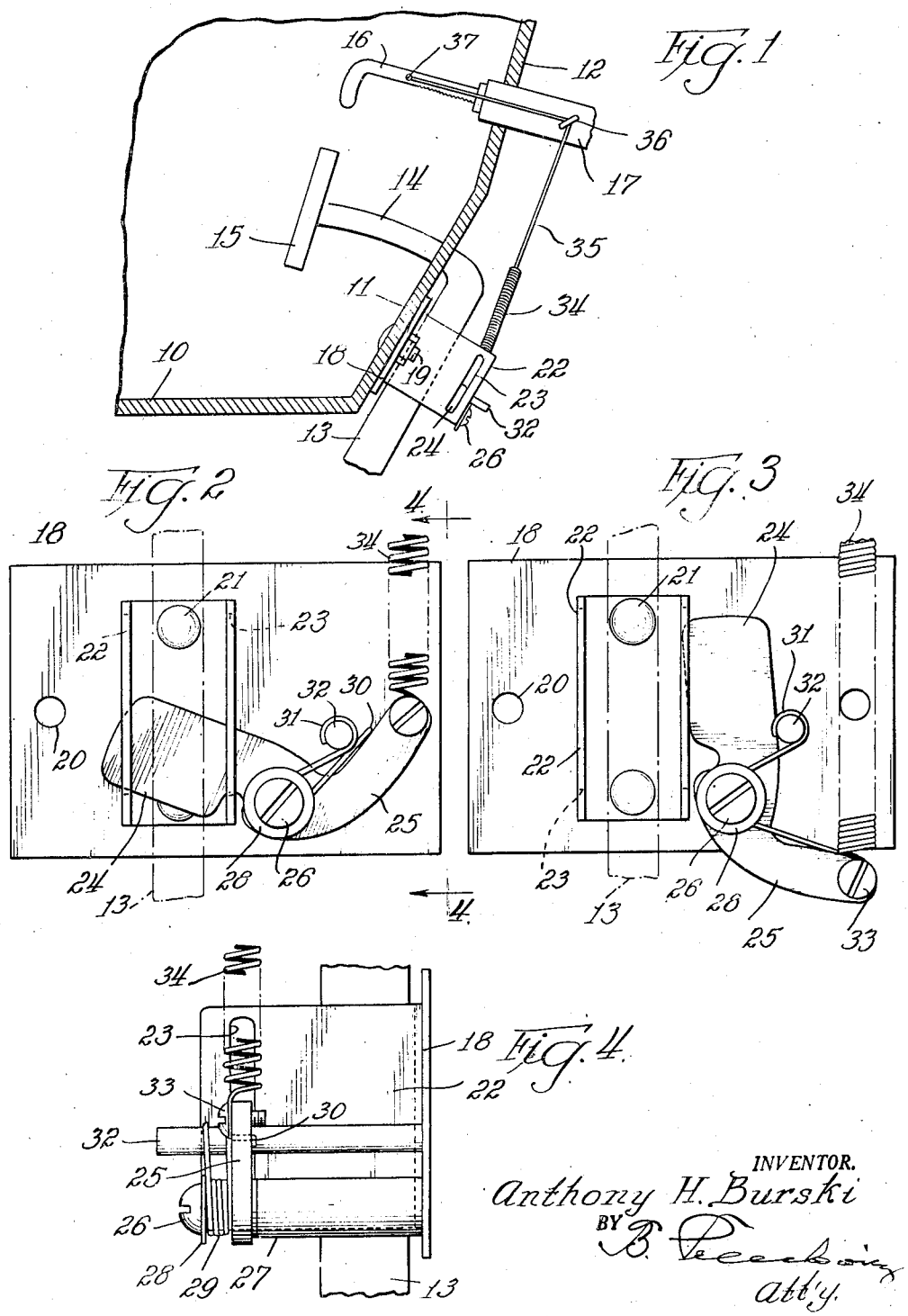

2,487,919

UNITED STATES PATENT OFFICE 2,487,919

MOTOR VEHICLE LOCKING DEVICE

Anthony H. Burski, Chicago, Ill.

Application July 24, 1947, Serial No. 763,315

2 Claims. (Cl. 74—540)

In the operation of a motor vehicle, it often happens that the driver forgets to release the emergency brake before starting the vehicle, and as a consequence the brake is subjected to a friction of great intensity which often starts fire or causes serious damage to the vehicle. Therefore, the principal object of the present invention is the provision of a locking means, in co-operation with the emergency brake operating handle, for locking a selected part of the vehicle's operating mechanism, such as clutch operating bar or the like, which, when locked simultaneously with the operation of the emergency brake handle, will prevent the starting of a vehicle until the emergency brake handle is brought to an inoperative position in order to release the clutch operating bar or other mechanism.

A still further object of the present invention is the provision of a locking device of the type hereinabove indicated, and which is of a comparatively simple construction and which can be readily affixed to the motor vehicles.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application and in which like designating characters refer to corresponding parts throughout the several views;

Fig. 1 is a cross-sectional view, longitudinally of the body of a motor vehicle, with the side elevation of the present device and in co-operation with the clutch operating bar and the emergency brake handle;

Fig. 2 is an enlarged face elevational view with the locking device in an operative position;

Fig. 3 is a similar view showing the locking device in a withdrawn, inoperative position; and Fig. 4 is a side elevational view of the locking device.

Referring in detail to the present drawing, there is shown therein a motor vehicle body, including floor 10, foot board 11 and dashboard 12. The latter two separate the tonneau and the engine compartment. Positioned forwardly of foot board 11 is clutch operating bar 13, provided at its upper end with arm 14 which is extended through said foot board 11. Said arm 14 is provided with pedal 15 for resting driver's foot, whereby the pressure exerted upon said pedal 15 will shift said clutch operating bar 13 away from foot board 11 for operating the clutch. Extended through dashboard 12 is emergency brake operating handle 16 guided within sheath 17 rigidly supported within dashboard 12.

When said handle 16 is shifted inwardly into the body of the vehicle, the emergency brake is set on, and when the same is released for shifting into the opposite direction the emergency brake is released.

The present locking device, co-operating with said clutch operating bar 13 and said emergency brake operating handle 16, includes plate 18, which is affixed to the outer face of foot board 11 by means of screws 19 passing through registering apertures 20 made in said foot board 11 and said plate 18. Rigidly affixed to said plate 18 by means of rivets 21, or the like, is a U-shaped member 22, receiving therewithin said clutch operating bar 13 in a longitudinal relation. Said U-shaped member 22 normally permits free shifting movement of said clutch operating bar 13 in the direction to or away from plate 18 and between the two wings of said U-shaped member 22. Each of the two wings of said U-shaped member 22 is provided, adjacent its free end with a longitudinal slot 23, for accommodating therewithin locking tongue 24 as it shifts into or out of slots 23.

Integrally formed with said tongue 24 is extension 25 which is substantially in a transverse relation with said tongue 24. Substantially at the point of juncture with said extension 25, said tongue 24 is set and pivoted upon screw 26. Said screw 26 is passed through said tongue 24 and through sleeve 27, and is affixed or riveted to plate 18. Set upon said screw 26, and adjacent the head thereof, is washer 28. Interposed between said washer 28 and the adjacent face of tongue 24 is coil spring 29, one end of which is extended along the adjacent faces of said tongue 24 and said extension 25 and is bent transversely of said extension 25. The bent end abuts the adjacent edge of said extension 25, as at 30. The opposite end of said coil spring 29 is extended along the plane of the adjacent face of said washer 28, and is formed into hook 31, which is looped around pin 32, which is riveted by one of its ends to plate 18.

Normally said coil spring 29 is under an expanding tension for urging the ends thereof into opposite directions, that is away from each other. Since the ends of said coil spring 29 are anchored to said extension 25 and pin 32, tongue 24 will remain out of slots 23 and out of the path of the shifting movement of the clutch operating bar 13 due to the pressure exerted upon extension 25 by the co-operating end of said coil spring 29, as is clearly seen in Fig. 3.

Affixed to the free end of extension 25 by means of screw 33 is coil spring 34, the opposite end of which is affixed to cable or wire 35, the latter passed through guiding staple 36, and anchored by its opposite end to handle 16, as at 37.

From the hereinabove description it will be readily apparent that when emergency brake operating handle 16 is pulled inwardly into the body of a vehicle for setting the emergency brake, coil spring 34 and cable 35 will be simultaneously pulled therewith. This operation exerts pulling force upon extension 25 in an upward direction for shifting the same and tongue 24 angularly for driving said tongue 24 into slots 23 and positioning the same rearwardly of clutch operating bar 13 and in the path of the shifting movement of the latter, as is clearly seen in Fig. 2.

The last hereinabove described operation brings said tongue 24 into an operative position, and renders said clutch operating bar 13 inoperative. By virtue of this condition the motor vehicle driver will be unable to operate the vehicle until clutch operating bar 13 is first released, and this cannot be done until the emergency operating handle is shifted into an inoperative position for releasing the emergency brake. Thus, in effect the motor vehicle is rendered inoperative as long as the emergency brake is continued to be in an operative position.

Although the present device is shown to operate with clutch operating bar 13, it is to be understood that the same may be adapted for use in connection with other operating parts of the vehicle as accelerator operating mechanism, the brake operating parts, or many others, with slight or no modifications thereof.

Although coil spring 34 may be entirely eliminated if desired, and cable 35 may be directly connected with extension 25, but in that latter event the length of the cable employed must be accurately determined in advance of affixing of plate 18 to foot board 11. Coil spring 34, being expansible, will permit affixing of plate 18 to foot board 11 either nearer to or farther away from handle 16 within a reasonable range of the distance therebetween.

While there is described herein a preferred embodiment of the present invention, it is nevertheless to be understood that minor changes may be made therein without departing from the spirit and scope of the invention as claimed.

What I claim as new is:

1. As an article of manufacture, a locking device for motor vehicles comprising a plate, a pair of spaced wings rigidly mounted upon said plate in position to receive a lever therebetween, said wings being provided with registering openings, a locking member pivoted to said plate in position to extend through the openings in bridging relation between the wings in the path of movement of the lever, a pin rigidly affixed to said plate, tensioning means interposed between one end of said locking member and said pin for normally maintaining the opposite end of said locking member out of said openings, and an actuating member affixed to said first named end of said locking member for shifting said opposite end of said locking member into said openings against the action of said tensioning means.

2. In a motor vehicle, in combination with a vehicle operating mechanism including a shiftable member, and an emergency brake operating handle, a locking device for rendering said shiftable member inoperative on shifting said handle into an operative position, comprising a plate, a pair of wings extending from said plate in a substantially perpendicular relation therewith, said shiftable member being receivable between said wings for shifting movement on a plane parallel to said wings, said wings being provided with transverse alined slots, a locking member pivotally supported by said plate for shifting movement into or out of said slots, and connecting means between said locking member and said handle, on shifting said handle into an operative position said connecting means actuating said locking member for shifting the same into said slots and in the path of shifting of said shiftable member for rendering the latter inoperative.

ANTHONY H. BURSKI.

REFERENCES CITED

The following references are of record in the file of this patent:

UNITED STATES PATENTS

| Number | Name | Date |
| --- | --- | --- |
| 771,155 | Jamison | Sept. 27, 1904 |
| 1,222,085 | Donovan et al. | Apr. 10, 1917 |
| 1,328,899 | Ritter and Warn | Jan. 27, 1920 |
| 1,329,142 | Ritter and Warn | Jan. 27, 1920 |
| 1,400,243 | Siwecki | Dec. 13, 1921 |
| 1,593,315 | Story | July 20, 1926 |
| 1,595,850 | Abbott et al. | Aug. 10, 1926 |
| 1,720,915 | Monday | July 16, 1929 |
| 2,411,455 | Mullins et al. | Nov. 19, 1946 |